March 10, 1970  G. W. COPE ET AL  3,499,545
AUTOMATIC ELECTRIC COUPLER

Filed Nov. 29, 1967  4 Sheets-Sheet 2

Inventors:
Geoffrey W. Cope
George C. Skinner
By Wilmer Mechlin
their Attorney

Inventors:
Geoffrey W. Cope,
George G. Skinner
By Wilmer Mechlin
their Attorney

March 10, 1970  G. W. COPE ET AL  3,499,545
AUTOMATIC ELECTRIC COUPLER
Filed Nov. 29, 1967  4 Sheets-Sheet 4

Inventors:
Geoffrey W. Cope
George C. Skinner
By Wilmer Mechlin
their Attorney

United States Patent Office 3,499,545
Patented Mar. 10, 1970

3,499,545
AUTOMATIC ELECTRIC COUPLER
Geoffrey W. Cope, Williamsville, and George C. Skinner, Elma, N.Y., assignors to Dresser Industries, Inc., a corporation of Delaware
Filed Nov. 29, 1967, Ser. No. 686,600
Int. Cl. B61g 5/06
U.S. Cl. 213—1.3          13 Claims

ABSTRACT OF THE DISCLOSURE

An electric coupler mounted on a mechanical coupler for automatically connecting electric lines between railway vehicles, having couplings for both a traction motor or other high voltage bus line and other relatively low voltage lines and so mounting the bus line coupling as to ensure against jumping of current therefrom to any of the other lines.

BACKGROUND OF THE INVENTION

Subway and other self-propelled rapid transit cars drawing their power from a third rail usually are individually connected to the rail. However, if any part of a rapid transit system in which the demands are such as to make it practical consistently to run the cars in long trains of upwards of ten or more cars each, large savings could be realized by discontinuing the third rail over difficult stretches within the overall length of the train, such as crossovers, yards and bridges, were it practical to supply the traction power for all of the cars through either end of the train. This, for a train using conventional DC traction motors, would involve transmitting between the cars direct current of around 600 v. and a maximum normal amperage of about 1600 but with possible momentary surges up to as much as 3000 amps. As in Tomlinson Patents Nos. 1,319,311 and 1,422,241, automatic electric couplers for rapid transit vehicles have heretofore been designed for connecting both train service lines and higher voltage bus lines but in none of the prior couplers are the bus line couplings either designed or adapted to handle voltages even remotely approaching that required for driving the traction motors of a long train such as here suggested. It is with the solution of this problem that the present invention is primarily concerned.

SUMMARY OF THE INVENTION

The present invention has as its primary object to provide an improved automatic electric coupler for enabling railway cars to be electrically coupled for passing therebetween power for operating traction motors on some or all of the cars without endangering train electric service lines or electrical equipment supplied thereby.

The improved electric coupler preferably is designed for mounting as part of a railway coupler assembly on a suitable mechanical coupler and adapted, incident to mechanical coupling of a pair of electrically self-propelled rapid transit or like railway cars, for automatically coupling with a mating coupler for coupling traction power and other electric lines between the cars. The coupling for the traction line is separate from and shielded against possible damage by its relatively high power to any other electric coupling itself is a hermaphroditic knife coupling having electrically connected blade and blade-receiving members for enabling it to couple with a like coupler on another car irrespective of which end of each car is presented for coupling. In coupling, one of the members, usually the blade, is projectible into contact with the mating coupler but, when uncoupled, both members of the coupling are retracted or contained in the coupler's housing and in a de-energized or unloaded condition to protect operating personnel from possible injury. A multiple contact hermaphroditic coupling with one member projectible may also be used for the electric service lines, either with or without de-energizing when uncoupled.

The foregoing and other objects and features of the invention will appear hereinafter in the detailed description, be particularly pointed out in the appended claims and be illustrated in the accompanying drawings, in which:

FIGURE DESCRIPTION

DETAILED DESCRIPTION

Figure 1:
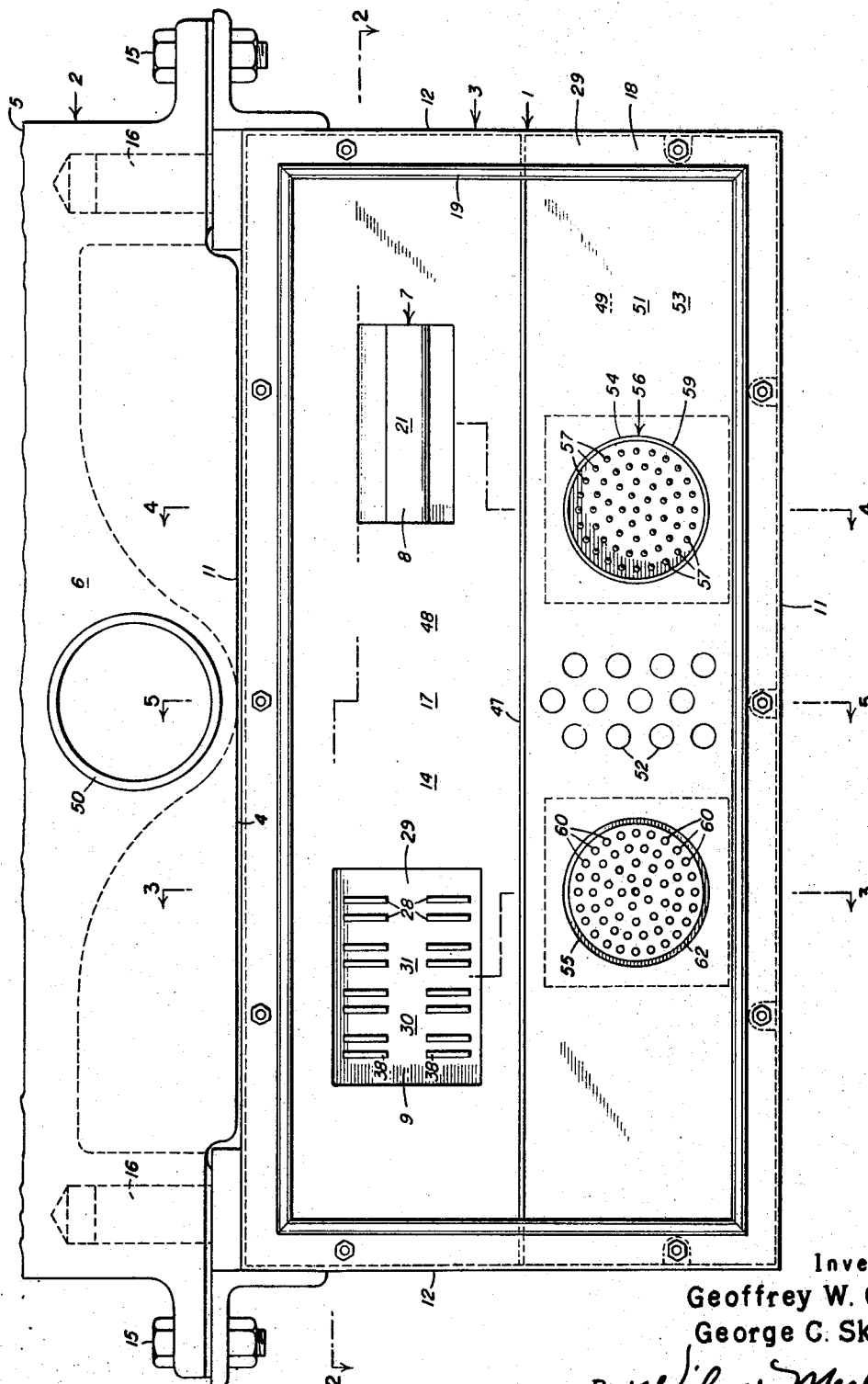
FIGURE 1 is a front elevational view of a preferred embodiment of the automatic electric coupler of the present invention, showing the coupler mounted on a mechanical coupler.
Figure 2:
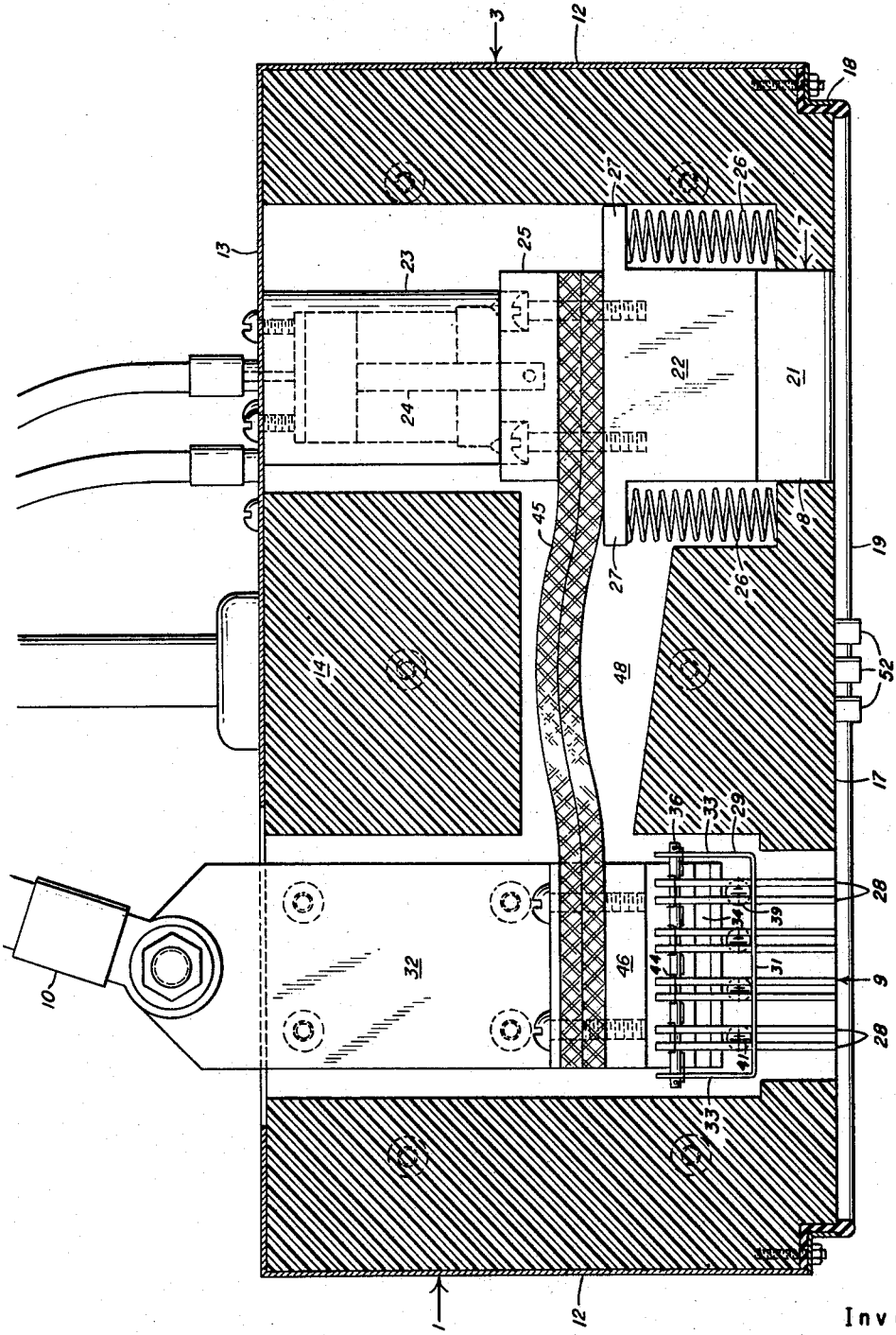
FIGURE 2 is a horizontal sectional view taken along lines 2—2 of FIGURE 1.
Figure 3:
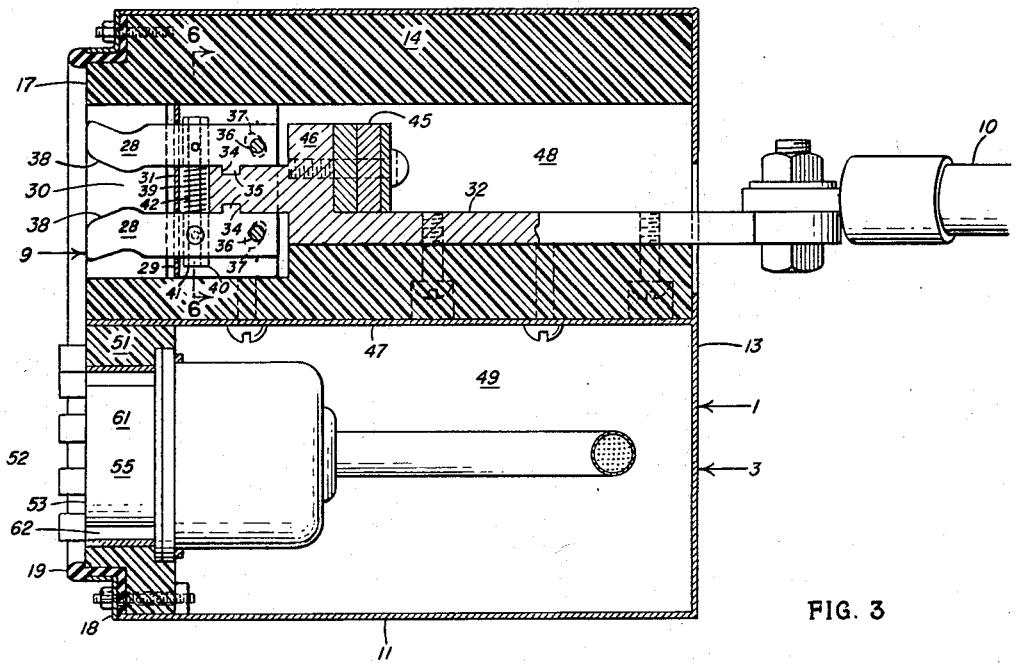
FIGURE 3 is a vertical sectional view taken along lines 3—3 of FIGURE 1.
Figure 4:
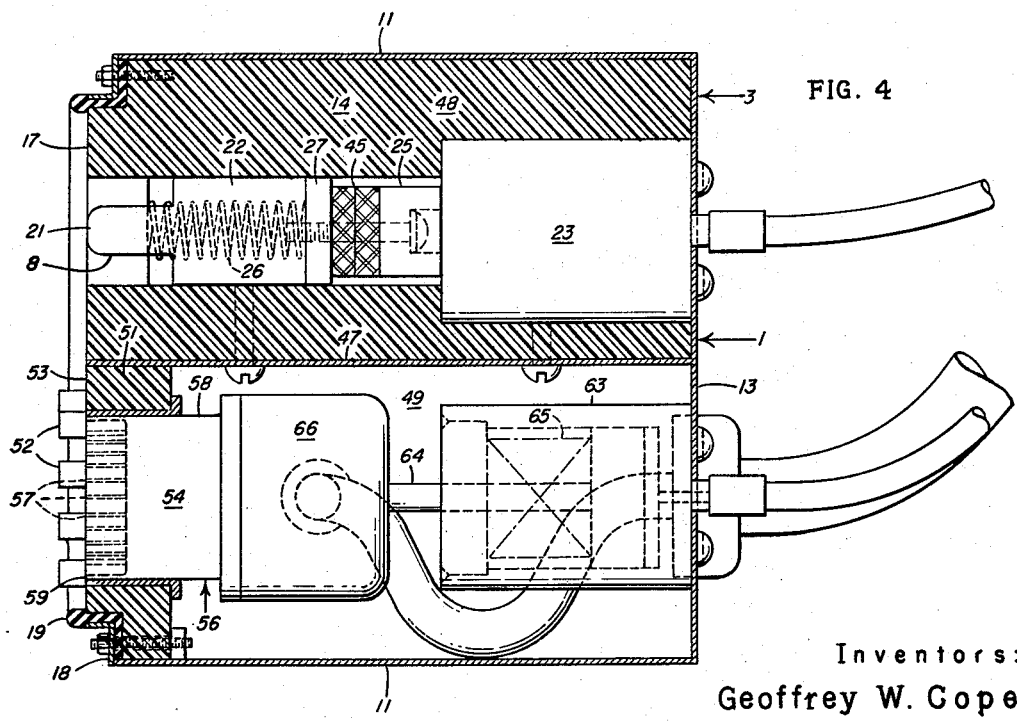
FIGURE 4 is a vertical sectional view taken along lines 4—4 of FIGURE 1.
Figure 5:
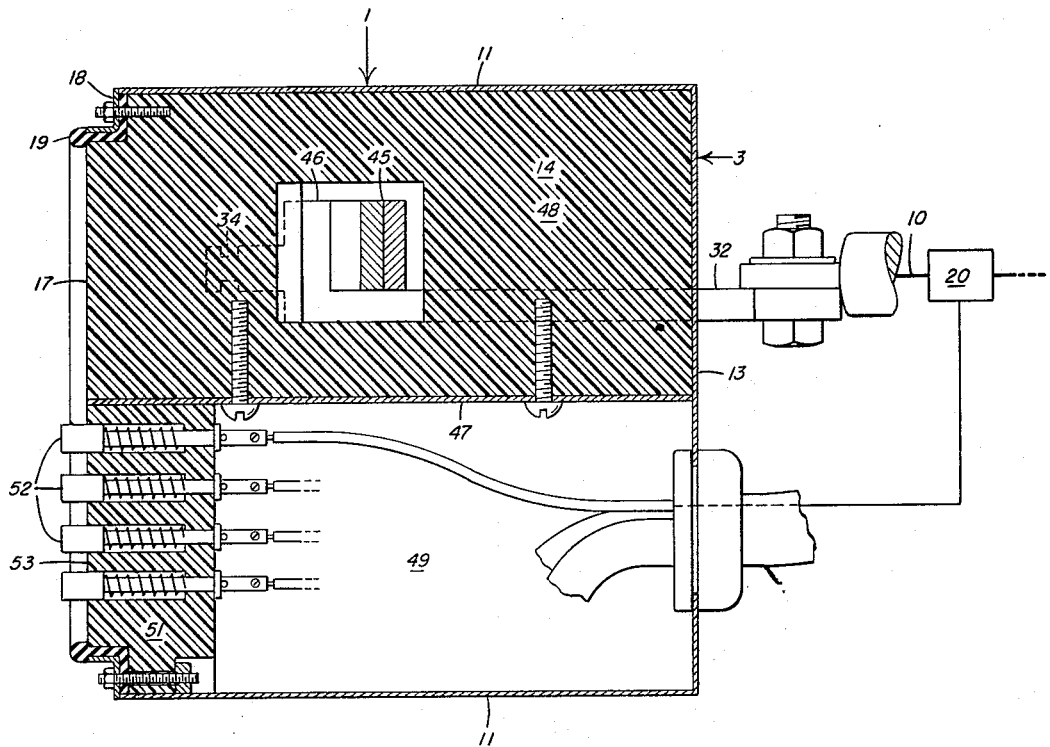
FIGURE 5 is a vertical sectional view, in part schematic taken along lines 5—5 of FIGURE 1.
Figure 6:
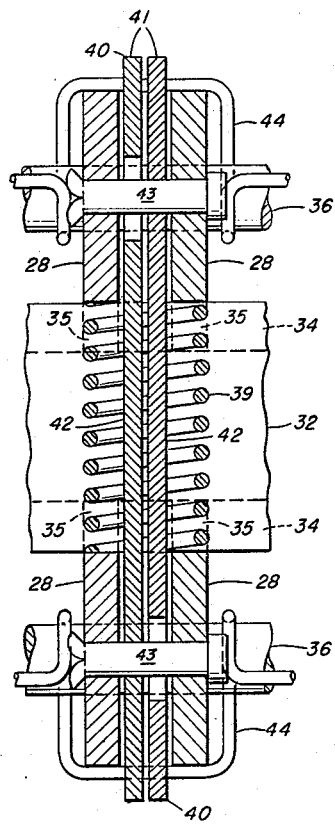
FIGURE 6 is a fragmentary vertical sectional view on an enlarged scale, taken along lines 6—6 of FIGURE 3.

Referring now in detail to the drawings in which like reference characters designate like parts, the improved automatic electric coupler of the present invention is particularly designed for coupling between cars a high voltage train bus line for supplying power to traction motors of electrically self-propelled railway cars.

Designated as 1, the improved electric coupler depends for mechanical coupling to a mating electric coupler on an associated mechanical coupler 2 on which it is adapted to be mounted. For properly aligning the electric coupler 1 with a mating coupler during and after coupling thereof, the mechanical coupler 2 should be of a type that, when coupled, is locked tightly against substantial relative movement to the mating coupler. A mechanical coupler meeting this requirement and widely used in subway and other electrically self-propelled rapid transit cars is an automatic hook type coupler and a form of that type particularly suited for mounting the improved coupler 1 and in part shown in FIG. 1, is illustrated in the copending application of Geoffrey W. Cope, Ser. No. 665,863, filed Sept. 6, 1967, now Patent No. 3,438,511.

The railway cars on which the electric coupler 1 probably will be most used are the so-called "multiple-unit" or "M-U" rapid transit cars. Depending on the required traction power, a particular train consist may have all self-propelled cars or include one or more trailer cars and in either case power for the electric motors of the self-propelled cars will be drawn from third rails by suitable trolleys or pantagraphs with which at least the self-propelled cars usually are equipped. Typically, the traction motors of the self-propelled cars may be 600 v. DC electric motors and, if as contemplated, a train consist of as many as ten or so cars is to be able to draw the power for the traction motors through any one of the cars, both a train bus line for the power with an in-car section extending through each car and electrical disconnects for the sections for transmitting the power between cars, should be able to carry a maximum power of around 650 v. and 1600 amps. To carry such high electric power, the between-car electrical disconnect of the present invention is of the knife type. As a component of such a disconnect, the traction power coupling 7 therefore is a knife coupling. For enabling it to couple or mate with the other component of the disconnect on the other car, whether the A or B end of the latter is presented for coupling, the knife coupling 7 is hermaphroditic and comprises a blade or male contact or member 8 and a blade-receiving, clip or female contact or member 9. Ordinarily electrically connected to each other and the section of the traction power bus line 10 in their car, the contacts 8 and 9 are laterally or transversely spaced, each in a position to align longitudinally and couple or connect with a mating, opposite or complementary contact of a mating coupling in a coupling operation.

The preferred housing 3 is of box-shape and closed at the sides by longitudinally extending top and bottom walls 11 and side walls 12 and at the rear by a rear wall 13. As the housing is itself conductive and solidly grounded through its mounting on the mechanical coupler 2, mounting of the traction power coupling 7 in the housing will surround the coupling completely or on all sides by a grounded surface for grounding any arc-over or arcing occurring at the coupling. However, while beneficial in this respect, the presence of the surrounding grounding surface makes it necessary to insulate the blade and blade-receiving members 8 and 9 of the coupling and the electrical connections thereof to each other and the bus line 10 from the housing to prevent shorting therethrough to ground when the coupling is energized. This is accomplished by mounting the coupling and its electrical connections within the housing at ample spacing from the walls thereof in a block 14 of suitable insulating material fitted or filling the portion of the housing occupied by the coupling and recessed or cut out for the surrounding or encasing the coupling members and their connections, the block, with respect to the coupling and its electrical connections, forming part of the housing and, as preferred, being either molded or lamellarly constructed of sheets of the material.

In the illustrated bottom form in which the coupler 1 is substantially coextensive in width and with the head 5 of the mechanical coupler and centered laterally thereon by both the attaching bolts 15 and positioning studs 16, the coupling members 8 and 9 conveniently are mounted in horizontal alignment in separate forwardly opening recesses in the insulator block 14 on opposite sides of and with their centers equally offset from the common longitudinal center-plane of the electrical and mechanical couplers. The insulator block preferably presents to a mating coupler a flat front face 17 and projects forwardly beyond the housing in which it suitably is releasably held by a retainer frame 18 surrounding its face and bolted or otherwise releasably attached to the housing's longitudinal walls 11 and 12. A rubber or like suitable gasket 19 clamped in place by the frame and projecting forwardly beyond and also surrounding the front face 17, is engageable with a like gasket on a mating electric coupler for shielding the couplings 7 thereof from rain or other atmospheric elements when they are coupled.

While protection of the coupling members 8 and 9, when they are uncoupled, is less vital, since they are then intended to be de-energized or unloaded by a suitable circuit breaker, indicated at 20, between the coupling and the bus line, it nonetheless is desirable for their protection that both members in their uncoupled or normal position be contained in the insulator block 14 and thus the housing 3 of which the block is a part. To do so and still be couplable with the coupling of a mating coupler, one of the members can be stationary but the other must be projectible and retractible or rectilinearly reciprocable or movable longitudinally of the electric coupler and the member so movable preferably is the blade member 8. For automatic operation, the blade member can be moved in both directions by fluid pressure or in one by such pressure and the other by spring means and it is the latter combination that is here used to provide a fluid pressure projection or advance or spring retraction or return.

As befits the high voltage it is required to carry, the blade member may be a solid block of high conductivity metal, such as copper, brass or bronze, with a thinner but rigid front portion forming a preferably horizontally disposed, blunt or round-nosed flat blade 21 backed by and centered vertically on the thicker rear or body portion 22, the sliding fit of which in the member's recess in the insulator block 14 guides the member and thus the blade in its longitudinal movements. A fluid cylinder unit 23 conveniently mounted on the housing's rear wall 13, has its piston 24 insulatedly connected to the blade member through a connecting block 25 of suitable insulating material attached as by screwing to the member and pinning to the piston. Projected by application of fluid pressure to the unit 23, the blade member is retracted into the insulator block 14 on release of that pressure by suitable return springing, which in the illustrated embodiment is in the form of a pair of coil springs on opposite sides of the blade member and socketed in and acting forwardly against the insulator block and rearwardly against wing flanges 27 adjacent the rear of and outstanding from the member's blade-backing portion 22.

With its own rigid blade 21 disposed parallel and movable, shiftable or reciprocable perpendicular or normal to the front face 17 of the insulator block 14 for engaging and disengaging the complementary or blade-receiving member of the mating coupler, the hermaphroditic traction power coupling 7 has as its female or blade-receiving member for receiving the blade of the mating coupler, a clip contact slotted to receive and spring-loaded to grip or clamp the mating blade and of sufficiently heavy construction to carry the traction power. Particularly suited for the purpose, the illustrated blade-receiving member 9 has a plurality of spaced, longitudinally extending rigid fingers 28 of bronze or like high conductivity metal mounted in laterally aligned and spaced sets in a rearwardly opening U-shaped frame 29, each set having vertically spaced pairs of fingers forwardly bounding and at opposite sides of a forwardly opening, horizontally extending, blade-receiving slot or socket 30 in the member forwardly of and bounded rearwardly by the front wall 31 of the frame.

A bus bar 32 mounted in the insulator block 14 and extending through the rear wall 13 of the housing 3 for releasable connection to the adjoining end of the associated in-car section of the bus line 10, projects forwardly between side walls 33 of the frame 29 and the pairs of fingers 28 of each set. The front portion of the bus bar between the fingers is necked by a pair of opposed, verticaly opening grooves or slots 34 in each of which seat or are received lugs or tongues 35 integral with and instanding from the fingers at its side of the bar. Locked to or interlocked with the bus bar 32 by the groove-and-tongue or lug connection therebetween, the fingers 28 also are adapted to rock, swing or pivot vertically on the bus bar about a fulcrum thereon substantially fixed by the interlock. In rocking, the fingers are individually guided by suitable slotting of the frame front wall 31 and both guided and limited, each by one of a pair of horizontal rods 36 at opposite sides of the bus bar 32, which extend through the fingers rearwardly of the lugs 35 and ride at opposite ends in arcuate slots 37 in the frame side walls 33.

Spring loading of the fingers 28 for normally urging the preferably beveled or outsloping front end 38 of each inwardly toward that of the opposite finger and correspondingly narrowing the slot 30 to less than the thickness of the blade 21, is produced by a plurality of compression coil springs 39, one for each set. Positioned in the space between the frame front wall 31 and bus bar 32, each spring 39 acts vertically between the opposed pairs of fingers of its set with its normal expanding force converted into a contracting force on the front ends 38 of the fingers by causing it to act on the opposed heads of a pair of headed connectors 41 whose stems 42 it encircles and which extend vertically between the fingers of both pairs. While the heads 40 and stems 42 of the connectors 41 are both apertured, each for connection to the fingers of an adjoining pair, suitably by a cotter pin 43, for the desired action only the aperturing of the heads is vertically elongated to permit vertical movement therebetween and the cotter pins so mounted and suitable spaced at the rear of the connecting rods 36 by spacer wires 44, the fingers 28, on projection of the blade member 8 of a mating electric couple after the couplers have been mechanically connected by coupling of the associated mechanical couplings 2, will be contacted and spread or expanded by the blade 21 of that member against the force of the loading springs 39 to permit entry of the blade into the slot 30 and thereafter will be held tightly in electrical contact with the blade by the springs.

In a train consist having DC traction motor and thus requiring only one bus line 10 for transmitting electric power to the motors of its cars and depending on the car frames and their mechanical coupling or the underlying rail for the ground line, the coupling members 8 and 9 will both be electrically connected to the bus line with the connection of the blade member flexible to accommodate its range of longitudinal movement. If, as in the illustrated embodiment, the female member 9 is directly connected to the bus bar 32, the required connection between the male member 8 and the bus line 10 suitably may be a flexible shunt 45 clamped at one end between the rear end of the back portion 22 of the male member and the connecting block 25 and at the other end to a flange 46 upstanding from the bus bar 32 rearwardly of the fingers 28.

Depending for energizing and de-energizing on the preferably remote controllable circuit breaker 20, the traction power coupling 7 can be energized in the interval between mechanical coupling and projection of its blade member 8. However, to prevent arcing at the coupling, it ordinarily will be preferably to postpone the energizing until the coupling is electrically connected or coupled to a mating coupling in a coupling operation and, conversely, to de-energize or unload the coupling in an uncoupling operation before it is disengaged or disconnected from the other coupling. For fully automatic coupling the installation also should include suitable remotely controllable valve means (not shown) for applying fluid pressure to the cylinder unit 23 of the blade member 8 at the appropriate time.

While the high voltage traction power coupling 7 can be the only electric coupling, the rapid transit cars for which the improved electric coupling 1 is particularly designed usually will have a number of other, reatively low voltage lines requiring connection between cars. In its preferred form the improved coupler therefor combines couplings for both high and low voltage lines with complete protection of the low voltage lines from damage by any arcing occurring at the traction power coupling 7. In this combined form, the housing 3 is divided or partitioned into two compartments, one adjacent and the other remote from the head 5 of the mechanical coupler 2 on which it is mounted, by an intermediate, interior or inside, electrically conductive metal wall or partition 47 which extends longitudinally of the housing between and is spaced from one pair of opposite longitudinally extending walls and connects the other pair.

In the illustrated bottom-mounted electric coupler, the intermediate or dividing wall or partition 47 is intermediate and spaced from the top and bottom walls 11, to which it preferably is parallel, and connects the side walls 12 to divide the housing 3 into upper and lower compartments 48 and 49, respectively, the former adjacent and the latter remote from the head 5. The high voltage traction power coupling 7, including the coupling members 8 and 9 and their electric connections, as well as the insulator block 14 mounting it, are mounted or contained in the upper or head-adjoining compartment 48. That compartment being bounded on all sides by the connected electrically conductive top and intermediate walls 11 and 47 and included parts of the side walls 12, all of which are grounded to the head 5 by the mounting of the housing 3 thereon, the traction power coupling 7, while separated or spaced from those walls against accidental grounding therethrough in normal operation by the insulator block 14, is surrounded completely on all sides by a solidly grounded electrically conductive surface which will effectively ground any accidental arcing or arc-over occuring at the coupling. In addition, should the accidental arcing occur during uncoupling, the presence in the illustrated head 5 of a brake line air coupling 50, which is centered on the head immediately above the electric coupler 1 and would momentarily be open at that time, would make an air blast available close to the coupling 7 for snuffing or smothering any such arcing.

Fully protected in the above manner from the high voltage coupling 7, the lower or outer compartment 49 is both available and suitable for mounting contacts for automatically coupling any relatively low voltage lines requiring connecting between cars. Depending on the installation, the low voltage lines may include train electric service lines for supplying power at 110 v. or other suitable voltage for operating lights or other in-car electrical equipment, control circuits for multiple-unit operation, analog or digital telemetery circuits and coupler and signal circuits. The lower compartment 49 is fitted with its own insulator block 51 for mounting any contacts therein in insulated relation to the bounding walls thereof. Any circuits of so low voltage as to be substantially non-arcing, such as signal circuits and, if circuitry such as disclosed in Gobrecht Patent No. 3,263,823 is used, coupler circuits involved in coupling and uncoupling, can readily be coupled by end contactable fixed contacts or contact pins 52 normally spring-urged or projected forwardly from the preferably common vertical plane of the front faces 17 and 53 of the insulator blocks 14 and 51, respectively, for engagement with corresponding contacts on the mating electric coupler during and prior to the completion of the coupling of the associated mechanical couplers. Any circuits carrying arcing voltages also can have fixed contacts, if de-energized or unloaded except when electrically coupled, as by a conventional drum switch, but it is preferred to eliminate the need for such a switch by providing those circuits with contacts which normally are retracted into or contained in the insulator block 51 and are electrically coupled and uncoupled only when the associated mechanical couplers are coupled.

Following the above preference, the contacts for the several train electric lines or circuits carrying voltages which, while low relative to that of the traction power line, are sufficiently high for substantial arcing were the contacts fixed, suitably are combined in and divided between plug or male and receptacle, socket or female members 54 and 55, respectively, of a hermaphroditic plug coupling 56. Conveniently, the fixed contacts 52 and the plug 54 and receptacle 55 of the plug coupler 56 are all mounted in the lower or outer insulator block 51, the fixed contacts in an arrangement centered laterally on the block and the plug and receptacle on opposite sides of and laterally spaced from the fixed contacts and at equal lateral spacing from the electric coupler's longitudinal center-plane. As the plug 54, the preferred coupling 56 has a plurality of conductive metal contact pins 57 molded or otherwise embedded in and extending through and projecting forwardly from a cylindrical base 58 of suitable insulating material. In the illustrated concentric ring or other suitable arrangement, with their forwardly projecting ends radially spaced sufficiently to prevent arcing therebetween, the pins 57 have those ends contained in and protected or shielded by a longitudinally substantially coextensive cylindrical annular shield 59 of insulating material concentric and integral or rigid with and of smaller outside diameter than the base 58. The receptacle 55 has as its contacts for receiving the pins 57 of the plug 54 of the mating electric coupler, a plurality of open-fronted conductive metal tubes or sockets 60, alike in number and arrangement to the pins, and molded, embedded or mounted in an extending through but flush at the front with a base 61 of suitable insulating material. A front-opening groove 62 in the insulator block 51 around and concentric with the base 61 is of a size to receive, seat or accommodate the shield 59 of the plug 54 of the mating electric coupler.

As in the case of the traction power coupling 7, the female member or receptacle 55 is stationarily mounted substantially flush at the front with the insulator block 51 and the male member or plug 54 is shiftable, reciprocable or movable longitudinally of the housing 3 in the insulator block with its base 58 slidably mounted therein and keyed or otherwise held against rotation relative thereto for maintaining or holding its pins 57 in proper alignment. The plug 54 may be advanced and retracted from and to its normal retracted position flush with the front face 53 of the insulator block 51 by any means suitable for automatic or remote operation, that illustrated being a one-way fluid cylinder unit 63, the piston 64 of which is advanceable by fluid pressure against the yieldable resistance of an inbuilt return spring 65. The piston 64 is drivably connected to the plug 54 through a casing 66 releasably attached to the back of the plug and enclosing the terminals (not shown) of the latter's pins 57.

The preferred use of the separate units 23 and 63 for individually powering or projecting the blade member 8 of the traction power coupling 7 and plug member 54 of the plug coupling 56, enables these members not only to be coupled and uncoupled automatically with the complementary or mating members of the mating electric coupler but also to be varied as desired in the timing of their coupling and uncoupling relative to each other and the associated mechanical couplers 2. Ordinarily, these members will both be coupled immediately after coupling and uncoupling immediately before uncoupling of the associated mechanical coupler, with the difference in the preferred embodiment that the traction power coupling as a whole will be deenergized by the associated circuit breaker except when coupled.

If, due to accidental uncoupling of the mechanical coupler, the traction power coupling 7 should happen to be energized during coupling or uncoupling, arcing most probably would occur at that coupling, but in such case, as previously explained, the low voltage lines or circuits coupleable by the several contacts in the lower or outer compartment 49 will be protected against damage from the arcing by the grounded conductive surface surrounding all sides of the upper or inner compartment 47. Too, further protection to low voltage lines in an accidental mechanical uncoupling with the traction power coupling energized and both the blade and plug members 8 and 54 protected, preferably is afforded by operatively connecting the circuit breaker of the traction power coupling for automatic and practically instantaneous response in opening to separation or uncoupling of one of the fixed contacts 52 or even one of the plug pins 57 and making the blade of such length relative to the longitudinal movement or depression on coupling of the fixed contacts or the length of the projecting portions of the plug pins that the traction power coupling will uncouple last and after the circuit breaker has had time to open. Thus de-energized or unloaded, the traction power coupling cannot cause any arcing when it finally does uncouple.

From the above detailed description it will be apparent that there has been provided an improved electrical coupler which can automatically couple a high voltage traction power line between cars for enabling the power for the traction motors of self-propelled cars of a train consist to be supplied through any car without danger to any relatively low voltage electric lines or equipment or personnel and can readily extend the automatic coupling to all circuits requiring connecting between the cars. It should be understood that the described and disclosed embodiment is merely exemplary of the invention and that all modifications are intended to be included that do not depart from the spirit of the invention.

Having now described our invention, we claim:

1. In a railway coupler assembly including a mechanical coupler for automatic mechanical coupling to a mating assembly, an electric coupler comprising a housing mounted on the mechanical coupler, a high voltage hermaphroditic electric knife coupling mounted in said housing and including spaced male and female coupling members adapted for direct connection to a source of high voltage supply and each electrically couplable to a mating member of a mating electric coupler, said high voltage knife coupling comprising a blade male member and a blade-receiving female member, both coupling members being normally contained in said housing and the male member of which is rectilinearly projectible for coupling forwardly from the housing, and an electrically conductive ground surface in said housing grounded to said mechanical coupler and laterally surrounding and insulated from said high voltage coupling.

2. An electric coupler according to claim 1, wherein the coupling members are both electrically connected to a section in a car to which the coupler assembly is applied of a high voltage power line through which power is supplied to traction motors of self-propelled cars of a train consist of which said car is a part.

3. An electric coupler according to claim 1, including relatively low voltage coupling means mounted in said housing outside of and electrically insulated from the grounded surface, and wherein the grounded surface and the high voltage coupling surrounded thereby are positioned between said coupling means and the mechanical coupler mounting the housing and grounding the surface.

4. An electric coupler according to claim 3, wherein the low voltage coupling means includes a hermaphroditic plug coupling for connecting between cars electric lines carrying arcing voltages, said plug coupling comprising a longitudinally projectible and retractible plug insulatedly mounting a plurality of pin contacts for certain of said lines and a stationarily mounted receptacle insulatedly mounting a plurality of socket contacts for other of said lines.

5. An electric coupler according to claim 4, wherein the plug coupling normally is contained in the housing and is couplable and uncouplable is energized condition while the coupler assembly is mechanically coupled, and the coupling means includes fixed contacts projecting forwardly from the housing and couplable and uncouplable on mechanical coupling and uncoupling of the assembly for electrically connecting and disconnecting lines carrying non-arcing voltages.

6. An electric coupler according to claim 3, wherein during coupling and uncoupling thereof the high voltage coupling is deenergized and the low voltage coupling means are energized.

7. An electric coupler according to claim 1, including means for deenergizing the high voltage coupling except when electrically coupled to a mating coupling.

8. In a railway coupler assembly including a mechanical coupler for automatic mechanical coupling to a mating assembly, an electric coupler comprising a housing mounted on the mechanical coupler, a high voltage hermaphroditic electric knife coupling mounted in said housing, an electrically conductive ground surface in said housing grounded to said mechanical coupler and laterally surrounding and insulated from said high voltage coupling, said high voltage knife coupling including spaced male and female coupling members each electrically couplable to a mating member of a mating electric coupler and both electrically connected to a section in a car to which the coupler assembly is applied to a high voltage power line through which power is supplied to traction motors of self-propelled cars of a train consist of which said car is a part, said male and female members respectively comprising blade and blade-receiving coupling members both mounted in the housing, the male member of which is reactilinearly projectible for coupling forward of the housing and the female member of which is stationary, a bus bar mounted in the housing laterally within and insulated from the ground surface, said bus bar extending longitudinally of the housing and geing electrically connected at opposite ends of the blade-receiving coupling member and the in-car power line section, and flexible means electrically connecting the blade-coupling member to the bus bar.

9. In a railway coupler assembly including a mechanical coupler for automatic mechanical coupling to a mating assembly, an electric coupler comprising a housing mounted on the mechanical coupler, said housing being bounded laterally by longitudinally extending electrically conductive outside wall means and partitioned laterally by a longitudinally extending electrically conductive inside wall into inner and outer compartments respectively adjacent and remote from the mechanical coupler, both said outside wall means and said inside wall being grounded to the mechanical coupler, a high voltage hermaphroditic electric knife coupling mounted in the inner compartment of said housing and including spaced male and female coupling members each electrically couplable to a mating member of a mating electric coupler, said male and female members respectively comprising blade and blade-receiving coupling members both mounted in the housing, the male member of which is rectilinearly projectible for coupling forward of the housing and the female member of which is stationary and relatively low voltage coupling means mounted in the outer compartment of said housing outside of and electrically insulated from the grounded surface.

10. An electric coupler according to claim 9, wherein the inside wall and portion of the longitudinally extending outside wall means of the housing therewith laterally bounding the outer compartment together form the grounded surface laterally surrounding the high voltage coupling for grounding to the mechanical coupler and threby protecting the low voltage coupling means from any arcing at the high voltage coupling on coupling and uncoupling thereof.

11. An electric coupler according to claim 10, wherein the low voltage coupling means include a plurality of contacts projectible and retractable in unison respectively into and out of electric coupling relation with mating contacts of a mating electric coupler for connecting and disconnecting between cars electric lines connected thereto and carrying arcing voltages.

12. In a railway coupler assembly including a mechanical coupler for automatic mechanical coupling to a mating assembly, an electric coupler comprising a housing mounted on the mechanical coupler, a high voltage hermaphroditic electric knife coupling mounted in said housing, an electrically conductive ground surface in said housing grounded to said mechanical coupler and laterally surrounding and insulated from said high voltage coupling, said high voltage knife coupling including spaced male and female coupling members each electrically couplable to a mating member of a mating electric coupler, said male and female members respectively comprising blade and blade-receiving coupling members both mounted in the housing, the male member of which is rectilinearly projectible for coupling forward of the housing and the female member of which is stationary, relatively low voltage coupling means mounted in said housing outside of and electrically insulated from the grounded surface, said low voltage coupling means including a hermaphroditic plug coupling for connecting between cars electric lines carrying arcing voltages, said plug coupling comprising a longitudinally projectible and retractable plug insulatedly mounting a plurality of pin contacts for certain of said lines and a stationarily mounted receptacle insulatedly mounting a plurality of socket contacts for other of said lines and remotably controllable means for separately projecting and retracting the blade member of the high voltage coupling and the plug member of the low voltage coupling means, wherein the ground surface and the high voltage coupling surrounded thereby are positioned between low voltage coupling means and the mechanical coupler mounting the housing and grounding the surface.

13. In a railway coupler assembly including a mechanical coupler for automatic mechanical coupling to a mating assembly, an electric coupler comprising a housing mounted on the mechanical coupler, a high voltage hermaphroditic electric knife coupling mounted in said housing, an electrically conductive ground surface in said housing grounded to said mechanical coupler and laterally surrounding and insulated from said high voltage coupling, said high voltage knife coupling including spaced male and female coupling members each electrically couplable to a mating member of a mating electric coupler, said male and female members respectively comprising blade and blade-receiving coupling members both mounted in the housing, the male member of which is rectilinearly projectible for coupling forward of the housing and the female member of which is stationary, relatively low voltage coupling means including a plurality of contacts mounted in said housing outside of and electrically insulated from the grounded surface and means for deenergizing the high voltage coupling except when coupled to a mating coupler, wherein the ground surface and the high voltage coupling surrounded thereby are positioned between said low voltage coupling means and the mechanical coupler mounting the housing and grounding the surface and in an uncoupling operation the high voltage coupling uncouples after and the deenergizing means therefor is operatively connected and responsive in deenergizing to uncoupling of certain of said contacts.

References Cited

UNITED STATES PATENTS

| | | | |
|---|---|---|---|
| 1,394,057 | 10/1921 | Woernley | 213—1.3 |
| 1,422,241 | 7/1922 | Tomlinson | 213—1.3 |
| 2,323,060 | 6/1943 | Larsson | 213—1.3 |
| 2,883,069 | 4/1959 | Candlin et al. | 213—1.3 |
| 3,263,823 | 8/1966 | Gobrecht | 213—1.6 |

DRAYTON E. HOFFMAN, Primary Examiner